United States Patent [19]

Palazzetti

[11] 4,226,214

[45] * Oct. 7, 1980

[54] APPARATUS FOR THE COMBINED PRODUCTION OF ELECTRICAL ENERGY AND HEAT

[75] Inventor: Mario Palazzetti, Avigliana, Italy

[73] Assignee: Fiat Auto S.p.A., Turin, Italy

[*] Notice: The portion of the term of this patent subsequent to Aug. 14, 1996, has been disclaimed.

[21] Appl. No.: 923,272

[22] Filed: Jul. 10, 1978

[30] Foreign Application Priority Data

Jul. 29, 1977 [IT] Italy ................................. 53376B/77

[51] Int. Cl.³ ....................... F02B 63/04; F02F 7/00; H02P 9/04
[52] U.S. Cl. .................................. 123/2; 123/195 C; 123/198 E; 165/52; 290/1 A
[58] Field of Search .................. 123/2, 195 R, 195 C, 123/198 E; 290/1 R, 1 A, 1 B; 165/41, 51, 52

[56] References Cited

U.S. PATENT DOCUMENTS

| 2,086,036 | 7/1937 | Juergens | 123/195 C |
|---|---|---|---|
| 2,670,933 | 3/1954 | Bay | 165/51 |
| 3,964,458 | 6/1976 | Strauss et al. | 165/41 |

Primary Examiner—Charles J. Myhre
Assistant Examiner—Craig R. Feinberg
Attorney, Agent, or Firm—Sughrue, Rothwell, Mion, Zinn and Macpeak

[57] ABSTRACT

Apparatus for the combined production of heat and electrical energy comprising an internal combustion engine driving an electricity generator and enclosed in a thermally insulated housing with heat exchangers for extracting heat from the engine coolant, the engine oil, the exhaust gases from the engine and from the electricity generator, and for transferring this heat to an external heating circuit, in which all the components are carried by a rectangular or cubic supporting framework to which the thermal and acoustic insulation panels are attached by quick-release fastenings, the engine and generator being connected together to form a rigid unit which is suspended from the framework while the ignition equipment of the engine is housed externally of the framework and cooled by the incoming air being drawn into the engine flowing through a housing in which it is supported.

19 Claims, 7 Drawing Figures

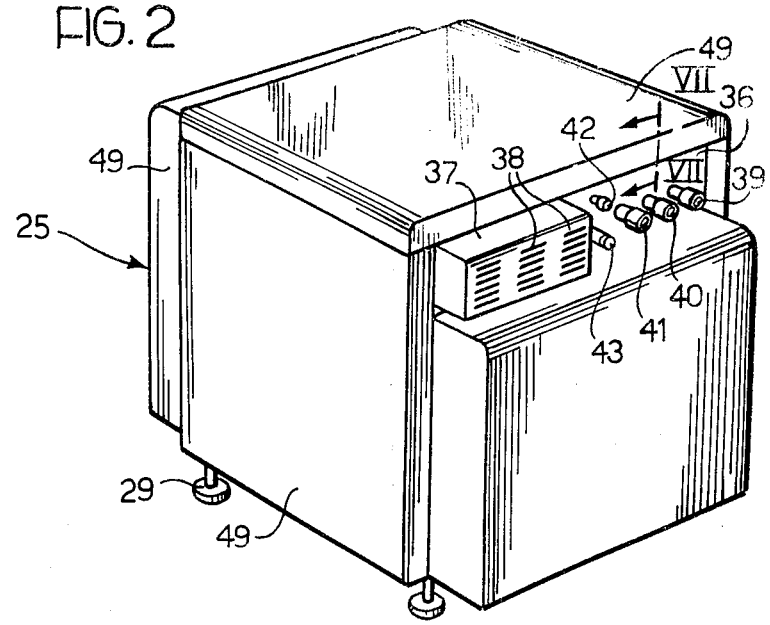
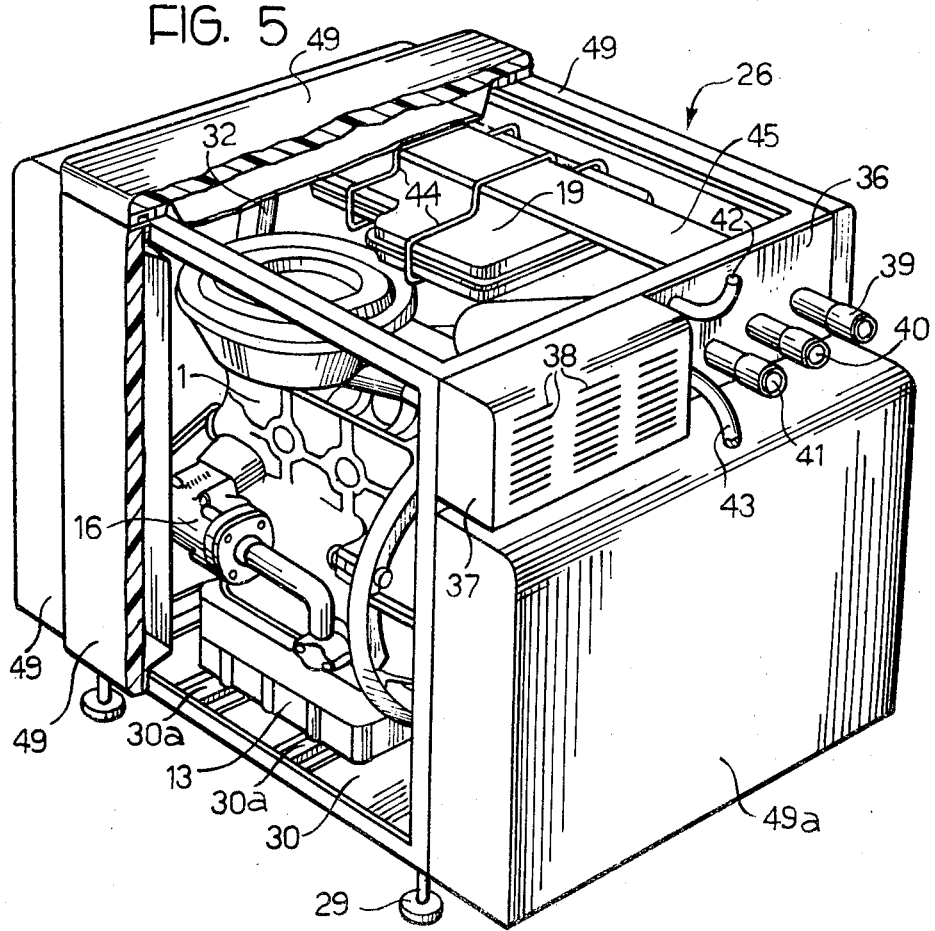

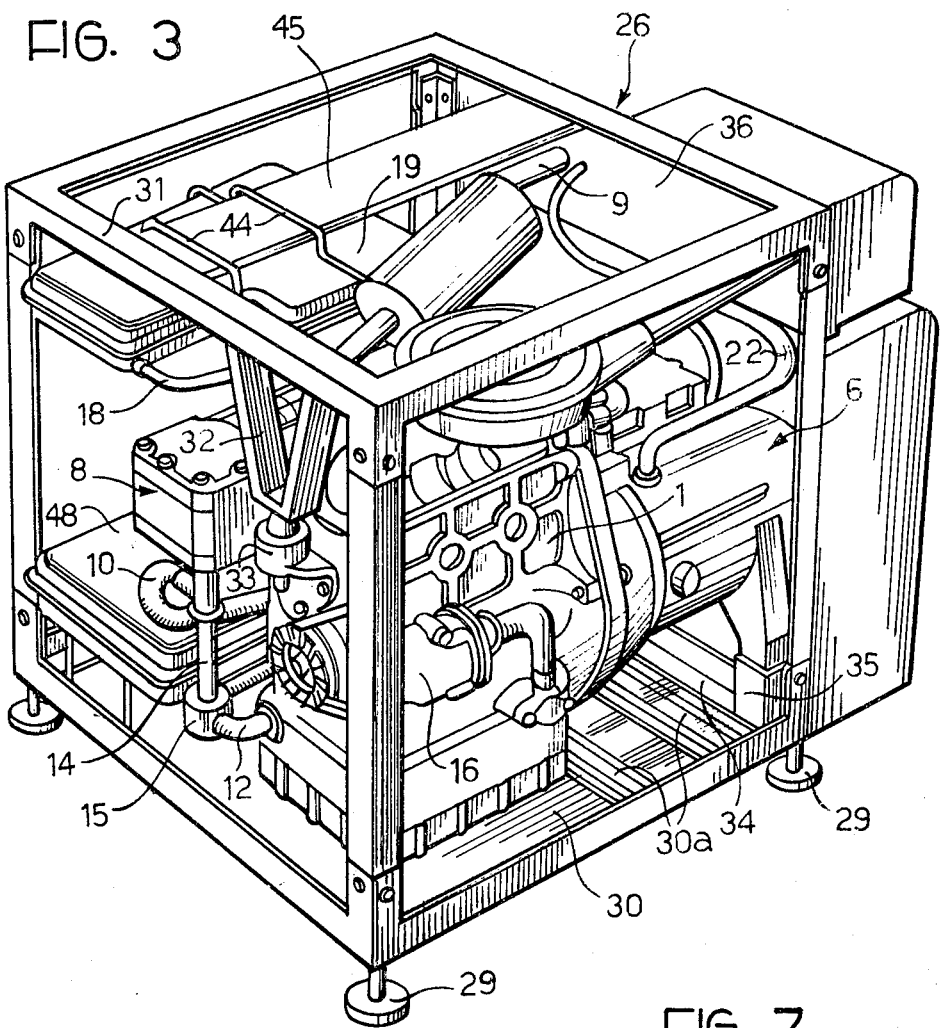
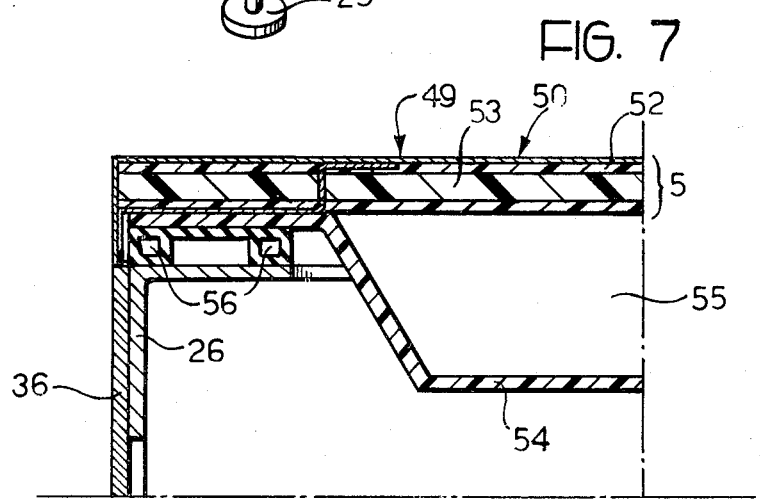

APPARATUS FOR THE COMBINED PRODUCTION OF ELECTRICAL ENERGY AND HEAT

The present invention relates to apparatus for the combined production of electrical energy and heat, in which a heat engine is employed to produce electrical energy and also the residual heat is recovered for the purpose of heating in order to make effective and rational use of an energy source.

Systems of this type hitherto proposed envisage the use of heat engines of large capacity, but this has associated problems both in regard to the overall yield (in that the dimensions of large capacity engines do not permit a good insulation) and in regard to the cost (in that it is not possible to use mass produced elements) and the distribution produces considerable cost in infrastructure organisation.

The present invention seeks to provide apparatus of the general type mentioned above which lends itself to the use of mass produced components from the motor vehicle industry and which, because it has small dimensions and individual shape, does not suffer from the disadvantages mentioned above.

An advantage of embodiments of the invention is that they can be made to produce a high yield (of the order of 90%), can be constructed in modular form arranged according to the requirements of use, and can be used in domestic building, industrial or agricultural environments as well as in connection with systems benefitting from solar energy and with systems for the recovery of waste heat from industrial operations.

According to the present invention there is provided apparatus for the combined production of electrical energy and heat, comprising a water cooled internal combustion engine, an electricity generator driven by the engine, and heat exchanger means which recovers heat from the cooling water, from the lubricating oil and from the exhaust gases of the engine as well as from the electricity generator for the purpose of heating, in which all the component parts of the apparatus are carried on a supporting framework formed by metal elements positioned to define the edges of a parallelepiped; the side and upper faces of the parallelepiped defined by the said framework being clad in thermally and acoustically insulating panels releasably attached to the framework.

One embodiment of the present invention will now be more particularly described, by way of example, with reference to the accompanying drawings, in which:

FIG. 2 is a perspective view of the apparatus of FIG. 1, shown from the rear;

FIG. 3 is a perspective view from the right and front of the apparatus of FIG. 1, with part of the cladding panels removed;

FIG. 5 is a view similar to FIG. 2, on a larger scale and with some of the panels removed;

FIG. 7 is a detail in section taken on the line VII—VII of FIG. 2 illustrating the structure of the insulating panels.

Figure 1:
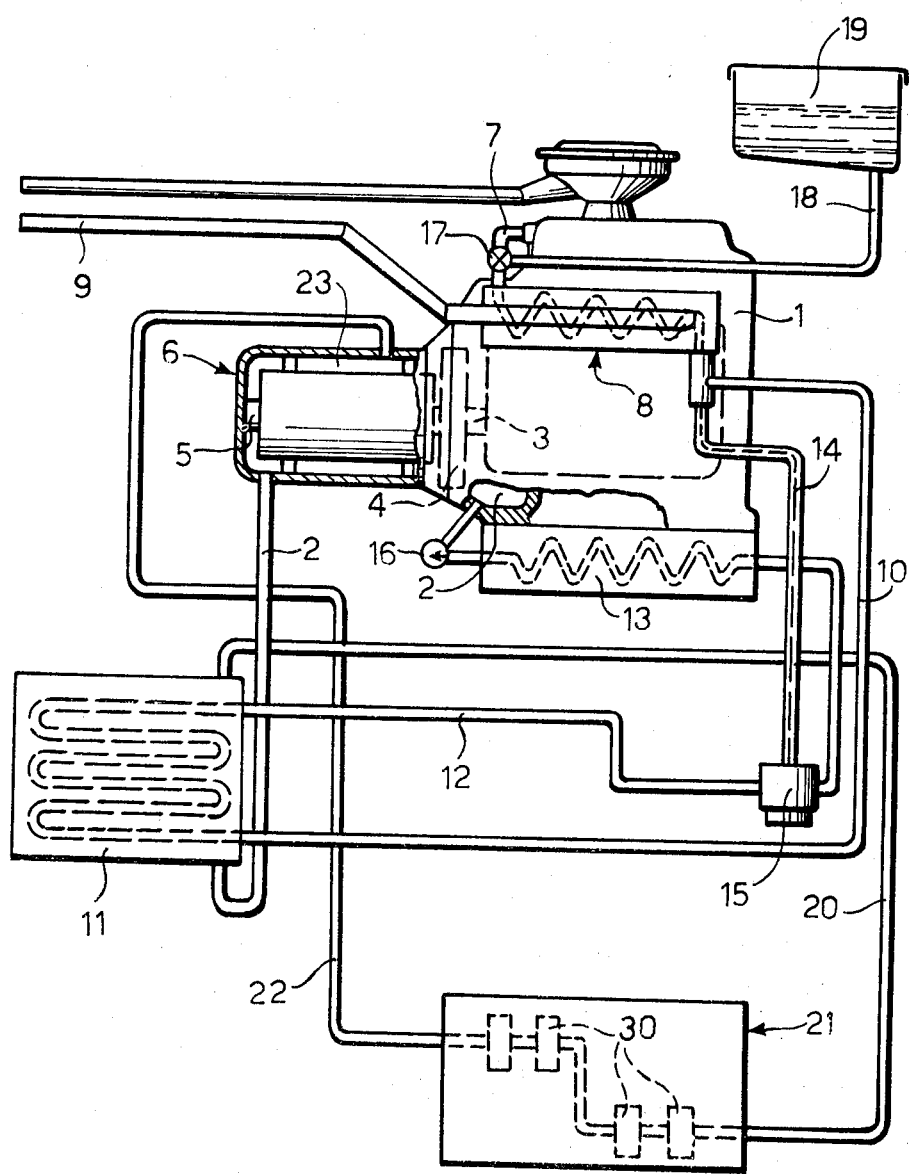
FIG. 1 is a schematic circuit diagram of apparatus formed as an embodiment of the invention.
Figure 4:
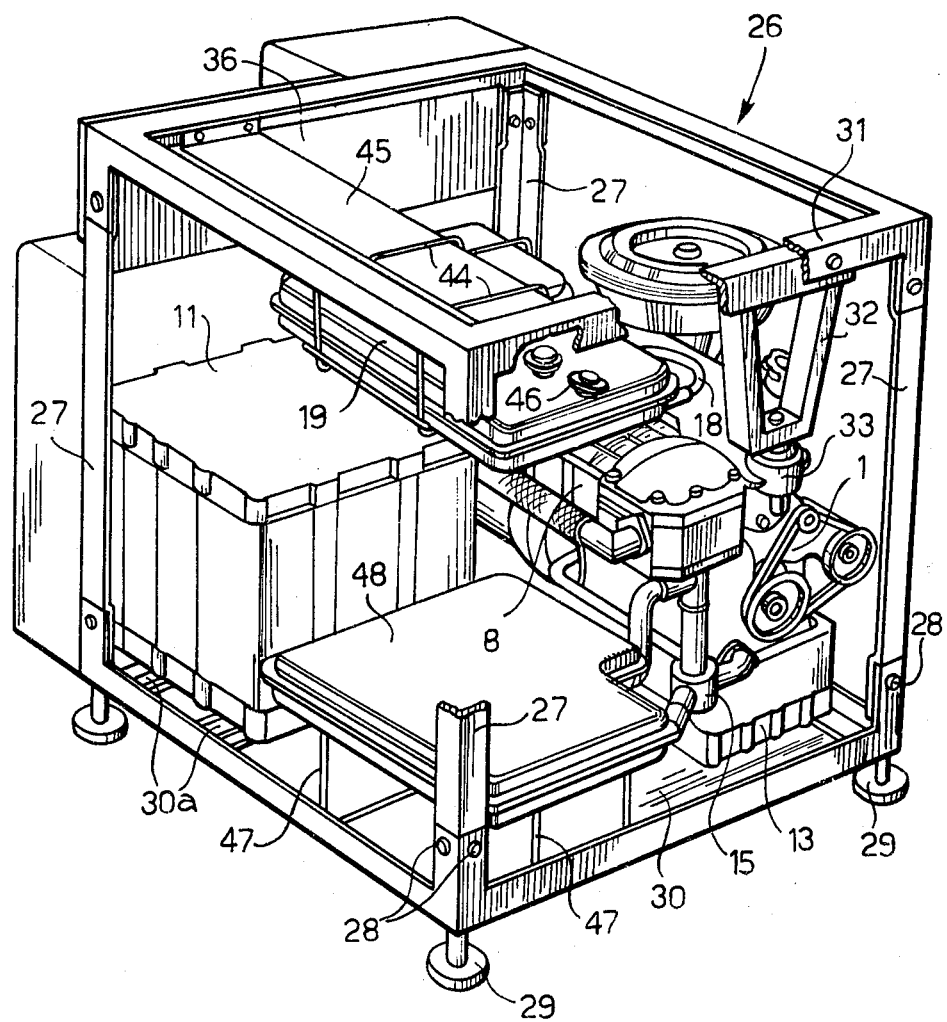
FIG. 4 is a perspective view similar to FIG. 3, looking at the left hand side.
Figure 6:
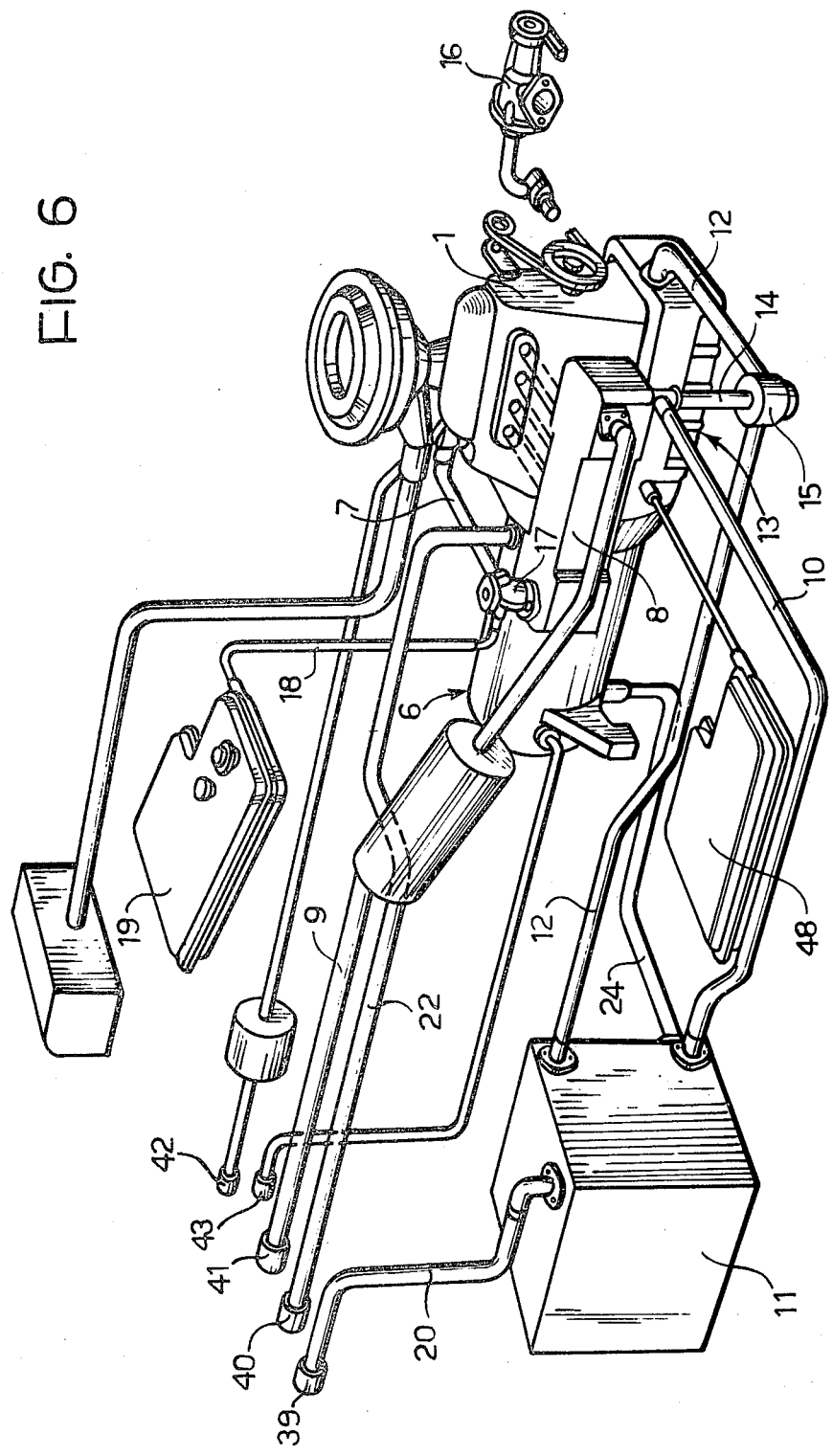
FIG. 6 is a partially exploded perspective view of the components of the apparatus.

Referring now to the drawings, the circuit diagram illustrated in FIG. 1 relates to apparatus of the type which forms the subject of Italian patent application No. 69573-A/76 by the same Applicant (corresponding to U.S. Pat. No. 4,164,660), and which is used in the apparatus which forms the subject of the present invention.

In FIG. 1 there is shown a water cooled internal combustion engine 1 having a water jacket 2 within which the cooling water circulates. The motor 1 has a crankshaft 3 which via a flexible coupling 4 drives the shaft 5 of an electricity generator 6. The shaft 5 of the electricity generator 6 is preferably provided with grooves or splines (not shown) at the end which connects with the flexible coupling 4, with the object of allowing speedy replacement of the engine 1 for maintenance purposes.

The path of the engine cooling water, which constitutes the primary circuit, is as follows:

The hot water leaving from the highest point of the water jacket 2 of the engine is fed through a pipeline 7 into the secondary circuit of a heat exchanger 8, formed integrally with the cylinder head of the engine, and is further heated by the exhaust gases which flow through the primary circuit of this heat exchanger. At the outlet of the primary circuit of the heat exchanger 8 the exhaust gases are discharged into the atmosphere through an exhaust pipe 9.

At the outlet of the secondary circuit of the heat exchanger 8, the heated water is fed through a pipeline to the primary of a second heat exchanger 11, in which it transfers heat to water in the secondary of the heat exchanger 11, which flows in the external heating circuit (secondary circuit). At the outlet of the primary of the heat exchanger 11, the water of the primary circuit is fed through a pipeline 12 to a third heat exchanger 13 in the oil sump of the engine 1, at the outlet of which the primary water returns into the cooling jacket 2 of the engine.

A by-pass pipeline controlled by a thermostat valve 15 connects directly between the pipelines 10 and 12 and serves to exclude the heat exchanger 11 from the primary circuit whilst the engine 1 is warming up from cold, that is when it has just been started and everything is at a low temperature.

The water is circulated in the primary circuit by a circulation pump 16 located between the outlet from the heat exchanger 13 and the inlet to the water jacket 2, and the water pressure in such circumstances is controlled by a pressure control valve 17 which connects the primary circuit to the inlet of a pipeline 18 leading to an expansion chamber 19.

The secondary circuit includes a delivery pipeline 20 leaving the heat exchanger 11 and conveying the heated water to the consumer devices constituted, for example, by the radiators 30 of a heating installation in a building; from the consumer devices 21 a return pipeline 22 leads to the inlet of a cooling jacket 23 surrounding the casing of the electricity generator 6 and from this cooling jacket a pipeline 24 leads to the input of the secondary of the heat exchanger 11.

The structure of the heater unit indicated in its entirety as 25 in FIG. 2, will now be more particularly described.

A framework 26 formed by angle-section metal struts defines the edges of a parallelepiped, preferably a cube as shown in the drawings. The uprights 27 of the cubic framework are connected in a dismantlable manner, for example by bolted connections 28, to two frames which form the top and bottom of the cube in order to facilitate the installation of the apparatus in places of difficult access.

To the square or rectangular frame forming the base of the cubic framework, there are fixed in a dismantlable manner support feet 29 which may be adjusted in height. Moreover to the base of the framework there is fixed a metal plate 30 forming a bottom wall.

To the upper horizontal rail 31 at the front of the cubic framework 26 is fixed a support 32 from which is suspended by means of a vibration-damping support 33, the front part of the engine 1. The cylinder block of the engine is connected rigidly to the casing of the electricity generator 6. To the lower horizontal rail 34 at the rear of the cubic framework 26 two supports 35 are fixed (only one of which is shown in FIG. 3) for the suspension, by means of vibration-damping supports, of the rear part of the generator 6. The position of supports 32 and 35 is such that the rigid assembly comprising the motor 1 and the generator 6 is located closely adjacent to one of the side faces of the cube defined by the framework 26.

The internal combustion engine 1 is a spark ignition engine with a displacement of the order of 1000 cc, such as is used in the Fiat 127 motorcar, and the dimensions of the cube defined by the frame containing the apparatus are therefore small; the length of each side of the cube is of the order of 1 meter.

To the upper sections of the framework 26 which define the rear face of the cube there is fixed a plate 36 on which is mounted a box 37 projecting outwardly of the cube and containing the electronic ignition apparatus of the engine. The box 37 is provided with slits 38 for the inlet of air drawn in by the engine.

On the same plate 36 there are mounted two connectors 39 and 40 for the connection of the heating apparatus to the pipes of the secondary heating circuit, an exhaust pipe 41 of engine 1, a pipeline 42 for feeding the fuel to the engine and the output cable 43 for the electricity generated by the generator 6.

The fuel fed through the pipeline 42 may be liquid or gas, for example methane gas, liquified petroleum gas, manufactured gas, bio gas or methyl alcohol.

The electricity generator 6 is constituted by a three-phase asynchronous motor the characteristic curve of which enables it to be used both for the starting of the engine and for the generation of electricity.

The expansion chamber 19 of the primary circuit is supported slidably by means of brackets 44 on a lengthwise support element 45 which connects the upper horizontal rails of the front and the rear of the cube defined by the framework 26 for accessibility of a refilling cap 46 of the chamber.

The heat exchanger 11 at which heat is transferred from the water of the primary circuit to the water of the secondary circuit is supported on the bottom 30 of the framework 26 by reinforcing cross members 30a. A pair of spacer elements 47 carried on the bottom 30 support a reserve oil container 48 which communicates with the oil sump of the engine 1 and carries a reserve supply of lubrication oil.

The heat exchanger 8 at which heat is transferred from the exhaust gases to the water of the primary circuit is of the type which forms the subject of Italian patent application No. 69,292-A/76 filed by the same applicant, and is fixed directly to the cylinder head of the engine 1.

To the sides and to the upper face of the framework 26 are attached by means of quick release couplings (not illustrated), a number of thermal and acoustic insulation panels indicated by the reference numeral 49. The insulation panel 49a mounted on the rear face of the framework is, of course, of less height than the others in that it extends only up to the base of the box 37 to allow this and the connections 39 to 43 carried by place 36 to be exposed.

As shown in FIG. 7, each insulating panel 49 has a support structure 50 of sheet metal, an obsorbent structure 51 formed by two layers 52 of insulating material of bituminous base with, between them, an intermediate layer 53 of loose porous material and an internal wall 54 of sound deadening material, which defines an air chamber 55.

Between each panel 49 and the parts of the metal framework 26 there are interposed damper blocks 56 made of an elastomer material.

What is claimed is:

1. A self-contained modular unit for the combined production of electrical energy and heat, comprising
   an internal combustion engine having a coolant jacket for the circulation of liquid coolant, and a coolant inlet and outlet communicating with said jacket;
   a primary liquid coolant circuit including said engine coolant jacket, a gas/liquid heat exchanger through which the engine exhaust gases flow to give up heat to coolant flowing out of the jacket outlet and a liquid/liquid heat exchanger disposed in said primary circuit between said gas/liquid heat exchanger and the jacket inlet;
   a secondary liquid circuit comprising said liquid/liquid heat exchanger and a heating apparatus;
   an electrical generator driven by the engine, said generator having a casing and a cooling jacket surrounding the casing, said generator cooling jacket being connected in said secondary circuit to receive a cooling flow of liquid therefrom; and
   a housing for said unit, said housing having a box-like structure and being comprised of a support framework formed by metal elements positioned to define the edges of a parallelepiped, thermally and acoustically insulating panels cladding the side faces and the upper face of the parallelepiped defined by said framework and means releaseably attaching said thermally and acoustically insulating panels to said framework.

2. A self-contained modular unit as in claim 1, wherein the frame elements which define the lower face of said parallelepiped framework carry reinforcing elements which support the heat exchanger at which heat is transferred from said engine coolant water to the water of the external heating circuit.

3. A self-contained modular unit as in claim 1, wherein the supporting framework is formed such that it can support not only the weight of the components of the apparatus, but also an overload equal to the total weight of the apparatus itself, in such a way as to enable, after the removal of the upper panel, the superpositioning of a second apparatus the supporting feet of which have been removed.

4. A self-contained modular unit as in claim 1, wherein there is a tank carried by the frame elements which define the upper face of said parallelepiped framework, said tank serving as an expansion chamber for the engine coolant.

5. A self-contained modular unit as in claim 4, wherein there are means slidably supporting said expansion chamber, said means including a support element extending from the upper edge of the front face of said parallelepiped frame to the upper edge of the rear of said parallelepiped frame, said expansion chamber having a refill cap at its front end which is accessible upon removal of the front insulation panel.

6. A self-contained modular unit as in claim 1, wherein said internal combustion engine is of the spark-ignition type.

7. A self-contained modular unit as in claim 6, wherein said engine has a displacement of the order of 1000 cc.

8. A self-contained modular unit as in claim 6, wherein the engine is provided with electronic ignition equipment.

9. A self-contained modular unit as in claim 8, wherein the electronic ignition equipment is housed outside said parallelepiped framework on said support plate carrying said pipework and said electrical cable, a housing being provided for said electronic ignition equipment through which housing passes air drawn in by the internal combustion engine.

10. A self-contained modular unit as in claim 1, wherein said metal elements forming said framework are connected together to define the edges of a cube.

11. A self-contained modular unit as in claim 1, wherein the lower face of the parallelepiped defined by said framework is provided with a metal plate forming a bottom wall.

12. A self-contained modular unit as in claim 11, wherein said plate forming the bottom wall of said parallelepiped supports a reserve oil container communicating with the engine oil sump.

13. A self-contained modular unit as in claim 1, wherein there are provided support feet,
means releasably attaching said support feet to the frame elements which define the bottom face of said parallelepiped framework, and
means for adjusting said support feet in height.

14. A self-contained modular unit as in any of claims 1, 10, 11, or 13, wherein thereare provided means releasably connecting the frame elements which define the upright edges of said parallelepiped framework to the frame elements which define the upper and lower faces of said parallelepiped framework.

15. A self-contained modular unit as in any of claims 1, 10, 11, or 13, wherein the shaft of said electricity generator is aligned with the shaft of said internal combustion engine and there are provided:
flexible coupling means joined to the engine shaft of said internal combustion engine,
splined coupling means coupling said generator shaft with said coupling, and
means connecting the casing of said electricity generator rigidly to the cylinder block of said internal combustion engine whereby to form from said engine and said electricity generator a rigid unit.

16. A self-contained modular unit as in claim 15, wherein said engine and generator unit is mounted adjacent to one of the sides of the parallelepiped defined by said framework with the axis of said engine shaft being substantially parallel to this face; the face of the parallelepiped framework adjacent that end of said engine which is remote from said generator constituting the front face of said apparatus and that face of the parallelepiped framework adjacent the end of said generator remote from said engine constituting the rear face of said apparatus.

17. A self-contained modular unit as in claim 16, wherein there are support means carried by that framework element which defines the upper edge of the front face of said parallelepiped framework, said support means carrying the front end of the engine/generator unit,
support means for the rear of the engine/generator unit being carried by the element of the framework which defines the lower edge of the rear face of the parallelepiped.

18. A self-contained modular unit as in claim 16, wherein there is a support plate attached to the elements of the frame which define the rear face of the apparatus, said support plate carrying:
an air intake for the engine,
a feed pipeline for fuel to the engine,
an exhaust pipe from the engine,
two unions for coupling the heating apparatus to the pipework of an external heating circuit, and
an output cable from the electricity generator;
the region occupied by said support plate being left exposed by the thermal and acoustic insulating panel on the rear face of said parallelepiped framework.

19. A self-contained modular unit for the combined production of electrical energy and heat, comprising
an internal combustion engine having a coolant jacket for the circulation of liquid coolants and a coolant inlet and outlet communicating with said jacket;
an electrical generator driven by the engine;
a primary liquid coolant circuit including said engine coolant jacket, a gas/liquid heat exchanger through which the engine exhaust gases flow to give up heat to coolant flowing out of the jacket outlet, a first liquid/liquid heat exchanger disposed in said primary circuit between said gas/liquid heat exchanger and the jacket inlet and a second liquid/liquid heat exchanger connected in said primary circuit between said first liquid/liquid heat exchanger and the inlet of the engine coolant jacket, said second liquid/liquid heat exchanger being situated in the oil sump of the engine for cooling oil therein;
a secondary liquid circuit comprising said first liquid/liquid heat exchanger, further heat exchange means to heat the liquid flowing in said secondary circuit by means of the heat dissipated by said generator and a heating apparatus; and
a housing for said unit, said housing having a box-like structure and being comprised of a support framework formed by metal elements positioned to define the edges of a parallelepiped, thermally and acoustically insulating panels cladding the side face and the upper face of the parallelepiped defined by said framework and means releasably attaching said thermally and acoustically insulating panels to said framework.

* * * * *